BEFORE FIRING

AFTER FIRING

BEFORE FIRING

AFTER FIRING

BEFORE FIRING

AFTER FIRING

United States Patent Office
3,689,356
Patented Sept. 5, 1972

3,689,356
GRAVITY ENHANCED SEAL
Gordon T. Foreman, Seneca Falls, N.Y., assignor to
GTE Sylvania Incorporated
Filed Mar. 8, 1971, Ser. No. 121,852
Int. Cl. B32b *1/04, 3/02, 17/00*
U.S. Cl. 161—149                                      10 Claims

ABSTRACT OF THE DISCLOSURE

An improved edge-oriented gravity aided seal is provided for an article of manufacture such as a planar display device having top and bottom members hermetically joined therearound. In one embodiment, the top member of the device has an advantageously beveled peripheral edge oriented inwardly from the defined periphery of the bottom member to provide a beveled edge-related ledge. Bonding material is disposed along the so formed angular jointure whereupon the seal region is heated. The softened bonding material, with the aid of gravity, forms a meniscus shaped fillet which covers extensive portions of the discretely related bevel and ledge areas to provide a strong uniform seal therealong.

BACKGROUND OF THE INVENTION

This invention relates to an edge oriented seal between two adjacent members at least one of them being glass and more particularly to a peripheral seal joining adjacent substantially planar members comprising a display device.

In planar or substantially flat type display devices. Enclosing portions, such as the usual front and back members, are normally peripherally joined by a seal of solder glass therearound to provide a hermetic enclosure. Since this extensive seal is a critical part of the construction, the form and relationship of the edges of the members to be joined are important considerations. In certain constructions involving a seal of this nature, one of the related planar members is usually of a larger perimetric dimension which provides a peripherally protruding area or defined ledge whereupon a continuous bead of compatible bonding material is discretely disposed therearound. When considering this type of seal, it has been accepted procedure to form a substantially square-cut perimetric edge around the smaller of the two members. When such is done, the resultant peripheral ledge is defined by the plane of the square cut edge of the smaller member forming a substantially 90 degree angular jointure relationship with the plane of the peripherally protruding area. It has been found that the seal effected along the jointure region thusly defined is not always of consistent quality thereby inherently weakening the structure of the device and introducing the factor of operational uncertainty.

OBJECTS AND SUMMARY OF THE INVENTION

It is an object of the invention to reduce the aforementioned disadvantages and to provide an improved edge-oriented seal exhibiting enhanced consistency and a method for achieving the same. Another object is to provide a seal for a planar display device having a substantially uniform bonding area between substantially parallel adjacent members.

The foregoing objects are achieved in one aspect of the invention wherein an edge-oriented seal of an article of manufacture, such as a planar display device, is formed by the aid of gravity to join compatible upper and lower adjacent members of the device. Both members are of a compatible size and shape and have defined peripheries therearound. The upper member, having a beveled periphery along the seal region, is oriented relative to the surface of the lower member in a manner that an edge of the bevel is spaced inwardly from the periphery of the lower member thereby providing an edge-related ledge on the lower member. The adjacent ledge and bevel planes advantageously effect an edge-oriented angular jointure region between the upper and lower members. A plastic bonding material is disposed along the seal region, whereupon heat is applied thereto to provide a substantially convex meniscus contoured fillet having bonded adherence to extensive areas on both of the favorably related planes comprising the ledge.

DESCRIPTION OF THE PREFERRED EMBODIMENT

For a better understanding of the present invention, together with other and further objects, advantages and capabilities thereof, reference is made to the following specification and appended claims in connection with the aforedescribed drawings.

In this specification, the term "periphery" is intended to be definitive of any shape of perimetric configuration.

Figure 1:
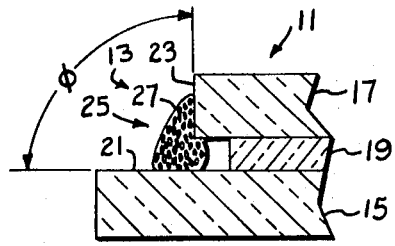
FIGS. 1 and 2 are partial sectional prior art views illustrating the structure of an edge-oriented seal.
Figure 2:
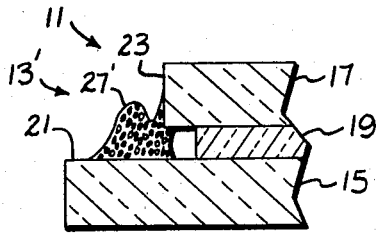

With reference to FIGS. 1 and 2, there is shown a sectional portion of an article of manufacture 11, employing a prior art edge-oriented seal 13, 13' to join parallelly positioned first and second planar related members 15 and 17 respectively. While edge-oriented seals apply to a number of structures, the embodiment described herein will relate, for example, to a planar type of display device, likewise denoted as 11. The related first and second members 15 and 17 may be either back or front portions dependent upon the nature of the structure. For expediency in describing seal formation, the first member 15 will be further referenced as the lower member 15 and the second member 17 as the upper member 17. Positioned therebetween is an undetailed display means delineated as separator layer 19. The prior art edge-oriented seal illustrated in FIGS. 1 and 2, is formed between the protruding ledge 21 of the lower member 15, and the square-cut edge 23 of the related upper member 17; the jointure region 25 therebetween being defined by the plane of the square-cut edge 23 forming a substantially 90 degree angular relationship $\phi$ with the plane of the protruding ledge 21.

A bead of a paste-like or plastic bonding material 27 such as a soft sealing glass in the form of a solder glass frit is disposed on the seal region as illustrated in FIG. 1. Upon heating to consummate the finished seal 13', in FIG. 2, the frit 27 softens and, because of the effect of gravity, on the mass of the softened frit material, tends to pull away from the substantially vertical surface of the square-cut edge 23, thereby producing a weakened seal of the prior art variety.

Figure 3:
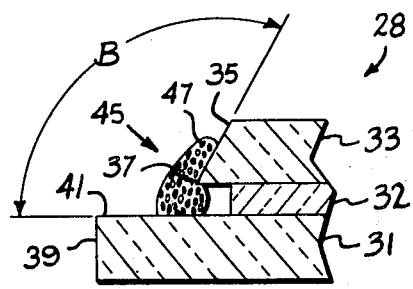
FIGS. 3 and 4 are partial sectional views showing an edge-oriented seal of the invention.
Figure 4:
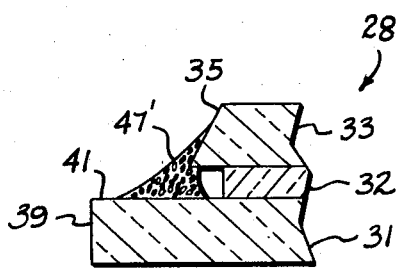

The improvements of the invention relating to the seal portions of planar display structures 28, 28' are shown in FIGS. 3 through 6. With particular reference to FIGS. 3 and 4, one embodiment of the improved seal 29, 29' is illustrated. A first or lower member 31 of a material such as glass is positioned in a substantially horizontal plane. Oriented superjacent thereto and in a plane substantially parallel therewith is a second or upper member 33 of a material such as glass having a beveled periphery 35 and representing a size and shape compatible with that of the lower member 31. Sandwiched therebetween is the compatible display means or separator layer 32. In the structure to be sealed, the upper member 33 is positioned relative to the lower member 31 in a manner that the forward edge 37 of the bevel is spaced inwardly from the periphery 39 of the lower member 31 to provide an edge-oriented ledge 41. The respective planes of the beveled periphery 35 and the ledge 41 effect an angular relationship β that is substantially within the range of 120 to 135 degrees defining therebetween the angular jointure region 45. Applied to this jointure region, in a manner to uniformly cover portions of the bevel and ledge areas 35, 41, is a substantially continuous bead of plastic bonding material 47. Such a solder glass composition, for example, can be frit sealing glass #7581, as manufactured by the Corning Glass Company, Corning, N.Y., and suspended in a volatile organic vehicle according to a frit to vehicle ratio encompassing the range of substantially 12:1 to 14:1.

The structure 28 as shown in FIG. 3, while being maintained in a horizontal plane, is then baked at a temperature less than that necessary to consummate bonding for a time period to substantially degas and at least partially remove the volatile materials from the environment of the display structure 28. A suitable baking temperature has been found to be within the range of substantially 75 to 125 degrees centigrade with the time period exceeding substantially 30 minutes, the specific length of time being dependent upon the size and mass of the structure.

The substantially degassed structure 28 being retained in a horizontal plane is then subjected to a firing temperature within the range of substantially 400 to 450 degrees centigrade for a period of time sufficient to soften and transform the glass frit bonding material 47 but not high enough to deform the planar members or be detrimental to the properties 31 and 33 of the article. This firing period exceeds 30 minutes, the exact time being determined by the mass of the structure. The seal thus effected is shown in FIG. 4 as assuming the form of a substantially concave meniscus fillet 47' bondingly adhered to at least a portion of the bevel 35 and ledge 41 areas. The discrete shape of the seal fillet 47' being determined by the angular relationship of the bevel 35 and ledge 41 areas in conjunction with the effect of gravity upon the mass of the softened frit material. The sides of the obtuse angle β defining the seal region beneficially direct the flow of the softened frit to provide bonded adherence to extensive areas on both of the planes 35, 41. The sealed article is then annealed and cooled in a conventional manner to prevent the formation of unwanted strains and compressions therein. Thus, a strong and uniform seal is achieved.

Figure 5:
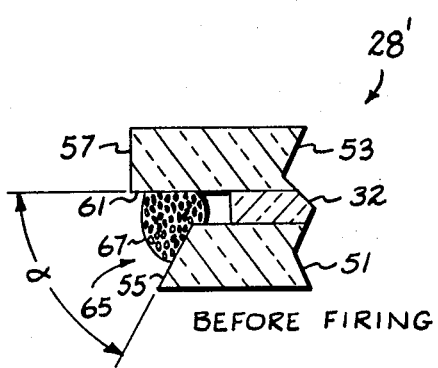
FIGS. 5 and 6 are partial sectional views illustrating another embodiment of an edge-oriented seal according to the invention.
Figure 6:
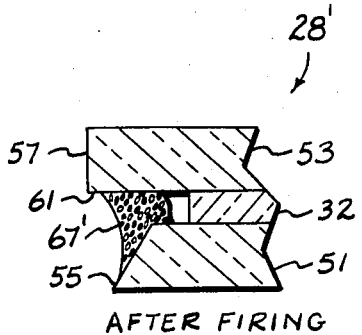

Another embodiment of the improved edge-oriented seal is illustrated in FIGS. 5 and 6 wherein the horizontally positioned lower member 51 has a beveled periphery 55. The upper member 53 is positioned above and parallel with the lower member 51 in a manner that a peripheral portion 57 of the upper member 53 extends in a manner to form an edge-related inverted ledge 61. The angular relationship α between the planes of the bevel 55 and the inverted ledge 61 is substantially within the range of 30 to 70 degrees defining therebetween the jointure region 65.

A bead of plastic bonding material 67, of the aforedescribed composition, is applied to the jointure region 65 whereupon the structure 28' is baked and fired in a horizontal position as was done in the first embodiment. The planes defining the sides of the acute angle α form the seal region in a manner to advantageously control the flow of softened frit, the mass of which is affected by gravity, to produce uniform bonded adherence to extensive areas on both of the adjacent planes 55, 61.

In the described embodiments, both of the members relating to the edge-oriented jointure have been defined as being of glass material. Such is not to be considered limiting, as one or both of the like-shaped seal members can be of metal surficially treated with glass in the jointure area.

Thus, the concave meniscus fillet, as employed in both of the aforedescribed embodiments, is the resultant of gravitational force functionally influencing the shape of the mass of the bonding material in conjunction with surface adhesion on beneficially angled surfaces. This combination produces a solder glass jointure that is a marked improvement over the priorly described seal wherein adjacent members had substantially 90 degrees peripheral relationship.

While there have been shown and described what are at present considered the preferred embodiments of the invention, it will be obvious to those skilled in the art that various changes and modifications may be made therein without departing from the scope of the invention as defined by the appended claims.

What is claimed is:

1. In an article of manufacture, an edge-oriented seal formed by the aid of gravity to join compatible adjacent members comprising:
    a first member having a defined periphery;
    a second member having a beveled periphery and being of a size and shape compatible with that of said first member, said second member being oriented relative to the surface of said first member in a manner that an edge of said beveled periphery is spaced inwardly from the periphery of said first member to provide an edge-related ledge on said first member, the respective planes of said bevel and said ledge effecting an angular jointure relationship therebetween; and
    a seal of bonding material disposed along said angular jointure region of said members in the form of a substantially meniscus shaped fillet covering extensive portions of said bevel and said ledge areas.

2. The article seal according to claim 1 wherein the angular relationship between the planes of said bevel and said ledge is substantially within the range of 120° to 135°, and wherein said first member is a lower member and said second member is an upper member.

3. The article seal according to claim 1 wherein the angular relationship between the planes of said bevel and said ledge is substantially within the range of 30° to 70°, and wherein said first member is an upper member and said second member is a lower member.

4. The article seal according to claim 1 wherein at least one of said members is glass, and wherein said bonding material is a glass frit composition.

5. The article seal according to claim 1 wherein said members have at least one separation element therebetween and wherein the respective planes of said bevel and said ledge maintain said angular jointure relationship therebetween.

6. A method of forming a gravity aided edge-oriented seal joining at least two adjacent and compatible lower and upper members of an article whereof the upper member has a beveled periphery, said method comprising the steps of:
    positioning said lower and upper members in a substantially horizontal superjacent relationship with one another, an edge of said beveled periphery being spaced inwardly from the periphery of said lower member to provide an edge-oriented ledge on said lower member, the respective planes of said bevel and said ledge effecting an angular jointure relationship therebetween;
    applying a plastic bonding material along said angular jointure region; and
    sealing said members by applying heat to said jointure area to soften said bonding material and achieve a gravity formed seal between said angularly related planes in the shape of a substantially concave meniscus contoured fillet having bonded adherence to extensive areas on both of said planes comprising said ledge.

7. A method of forming a gravity aided edge-oriented seal joining at least two adjacent and compatible lower and upper members of an article, whereof the upper member has a beveled periphery, said method comprising the steps of:

positioning said lower member in a substantially horizontal plane;

positioning said adjacent upper member in a superjacent manner relative to said lower member in a plane substantially parallel therewith, an edge of said beveled periphery being spaced inwardly from the periphery of said lower member to provide an edge-oriented ledge on said lower member, the respective planes of said bevel and said ledge effecting an angular jointure relationship therebetween;

applying a plastic bonding material along said angular jointure region to cover at least a portion of said bevel and ledge areas, said bonding material containing a volatile component therein;

baking said assembled members of said article at a temperature less than that to consummate bonding for a time period to substantially degas and at least partially remove the volatile materials from the environment of said assembly;

firing said substantially degassed assembly at a temperature and time to soften said bonding material and effect a seal in the form of a substantially meniscus contoured fillet bondingly adhered to at least a portion of said bevel and ledge areas, the shape of said seal fillet being determined by the angular relationship of said bevel and said ledge in conjunction with the effect of gravity upon the mass of said softened bonding material, said firing temperature and time not being detrimental to the properties of said article; and annealing and cooling said sealed article in a manner to prevent the formation of unwanted strains and compressions therein.

8. The method of achieving the gravity aided article seal according to claim 7 wherein at least of one of said members is glass, and wherein said bonding material is a glass frit composition.

9. The method of achieving the gravity aided article seal according to claim 8 wherein said baking step relates to a temperature within the range of substantially 75 to 125 degrees centigrade, and wherein the baking period exceeds substantially 30 minutes.

10. The method of achieving the gravity aided article seal according to claim 8 wherein said firing step relates to a temperature within the range of substantially 400 to 450 degrees centigrade, and wherein the firing period exceeds substantially 30 minutes.

References Cited

UNITED STATES PATENTS 1,224,530   5/1917   Goetzke _____ 161—45

WILLIAM A. POWELL, Primary Examiner

U.S. Cl. X.R.

156—107; 161—45, 192